(12) United States Patent
Wang et al.

(10) Patent No.: US 9,254,749 B2
(45) Date of Patent: Feb. 9, 2016

(54) CRUISE CONTROL INTERACTION WITH DRIVER COMMANDED SPEED RESET

(75) Inventors: Lan Wang, Troy, MI (US); Wenbo Wang, Novi, MI (US); Zhong Wang, Westland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2700 days.

(21) Appl. No.: 11/759,397

(22) Filed: Jun. 7, 2007

(65) Prior Publication Data

US 2008/0306668 A1 Dec. 11, 2008

(51) Int. Cl.
*B60K 31/00* (2006.01)

(52) U.S. Cl.
CPC ...................... *B60K 31/00* (2013.01)

(58) Field of Classification Search
USPC ........................................ 701/93, 97; 73/1.37
See application file for complete search history.

(56) References Cited

U.S. PATENT DOCUMENTS

| 4,046,213 | A | * | 9/1977 | Larson | 180/177 |
| 4,860,210 | A | * | 8/1989 | McCombie | 701/93 |
| 4,905,154 | A | * | 2/1990 | Strong et al. | 701/93 |
| 4,969,531 | A | * | 11/1990 | Hirakata et al. | 180/179 |
| 5,029,090 | A | * | 7/1991 | Kuhn et al. | 701/93 |
| 6,128,570 | A | * | 10/2000 | Akhteruzzaman | 701/93 |
| 6,314,358 | B1 | * | 11/2001 | Dorn et al. | 701/70 |
| 6,411,883 | B1 | * | 6/2002 | Basten | 701/93 |
| 6,832,147 | B2 | * | 12/2004 | Vornehm et al. | 701/54 |
| 7,212,905 | B2 | * | 5/2007 | Grill | 701/96 |
| 7,440,835 | B2 |   | 10/2008 | Shima | |

FOREIGN PATENT DOCUMENTS

CN 1728191 A 2/2006

* cited by examiner

*Primary Examiner* — Nicholas Kiswanto

(57) ABSTRACT

A cruise control system includes an input device that generates an operator input signal. A control module generates a cruise control command signal to maintain a vehicle speed at a set target speed. The control module operates in a normal mode that is associated with decreasing the set target speed, based on the operator input signal, when the vehicle speed is within a window about the set target speed. The control module overrides the normal mode and enables reset of the set target speed to a current vehicle speed, which is based on the operator input signal, when the vehicle operator input signal is greater than the cruise control command signal.

21 Claims, 7 Drawing Sheets

CRUISE CONTROL INTERACTION WITH DRIVER COMMANDED SPEED RESET

FIELD

The present disclosure relates to vehicle cruise control systems, and more particularly to acceleration and deceleration based cruise control techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cruise control systems are utilized on vehicles to enable the vehicle to maintain a desired vehicle speed. A controller maintains the vehicle speed through varying road and vehicle conditions. A vehicle operator may set and manipulate a cruise control target speed through depression of an accelerator pedal, a brake pedal, and/or a clutch pedal, as well as via actuation of hand controls.

When a target speed is set, cruise control systems attempt to maintain a current vehicle speed at approximately the target speed. The current vehicle speed may be different than the target vehicle speed due to various vehicle operating conditions. For example, when traveling on inclined road surfaces, the current vehicle speed may be less than or greater than the target speed.

Cruise control systems typically allow the vehicle operator to return to and/or increase a target speed by pushing a RESUME button or to set, decrease and/or reset the target speed by pushing a SET button. A calibration window is often centered about the target speed. A calibration factor is equal to half a width of the calibration window. A first target speed may be set by pushing the SET button when cruise control is active. A reset of target speed occurs when the SET button is pushed while vehicle speed is outside the calibration window.

The reset can either increase or decrease target speed. For example, the target speed is increased when the SET button is depressed and the current vehicle speed is equal to at least the target speed plus the calibration factor. Put another way, the target speed is increased when the current vehicle speed is greater than the target speed and outside the calibration window. The target speed is decreased when the current vehicle speed is greater than the target speed and inside the calibration window. Usually, the target speed is decreased by a set reduction amount through pushing of the SET button. When the SET button is depressed and the current vehicle speed is within the calibration window, the target speed is reduced.

As an example, the calibration factor may be set at 5 miles per hour (mph). When a request command signal is received to reset the target speed, the cruise control system either significantly increases or decreases the target speed, or slightly reduces the target speed such as 1 mph.

Under certain scenarios, a cruise control system may not respond to vehicle operator input as the vehicle operator intended. For instance, a vehicle operator may depress an accelerator pedal to increase the current vehicle speed to a command speed and push the SET button to reset the target speed. However, due to cruise control system operating limitations, the cruise control system may not reset the target speed at the command speed. The calibration factors are designed into cruise control systems to avoid inappropriate vehicle response, but have operating limitations.

As another example, when the calibration factor is large, a request command signal may be denied and thus a set target speed is not increased, but rather is decreased. Similarly, when the calibration factor is small, the target speed can be easily reset. A small calibration factor can result in an increase in the target speed without driver depression of an accelerator pedal, although the vehicle operator intended a decrease in the target speed.

As a further example, a vehicle when operating on a declined surface may experience a current vehicle speed that is above a target speed. The vehicle operator may attempt to reduce the target speed through depression of the SET button. However, since the current vehicle speed is greater than the target speed and outside a corresponding calibration window, the target speed may be increased.

SUMMARY

A cruise control system is provided and includes an input device that generates an operator input signal. A control module generates a cruise control command signal to maintain a vehicle speed at a set target speed. The control module operates in a normal mode that is associated with decreasing the set target speed, based on the operator input signal, when the vehicle speed is within a window about the set target speed. The control module overrides the normal mode and enables reset of the set target speed to a current vehicle speed, which is based on the operator input signal, when the vehicle operator input signal is greater than the cruise control command signal.

In another feature, a cruise control system is provided that includes an input device, which generates an operator input signal. A control module initializes a time period when the operator input signal includes a request command signal that is greater than a cruise control command signal. The control module resets a set target speed based on expiration of the time period and the operator input signal.

In still another feature, a method of operating a cruise control system is provided and includes generating a request command signal based on an operator input. A cruise control command signal is generated to maintain a vehicle speed at a set target speed. The cruise control system is operated in a normal mode that is associated with decreasing the set target speed, based on the operator input, when the vehicle speed is within a window about the set target speed. The normal mode is overridden and the set target speed is reset to a current speed, which is associated with said operator input, when the operator input signal is greater than the cruise control command signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
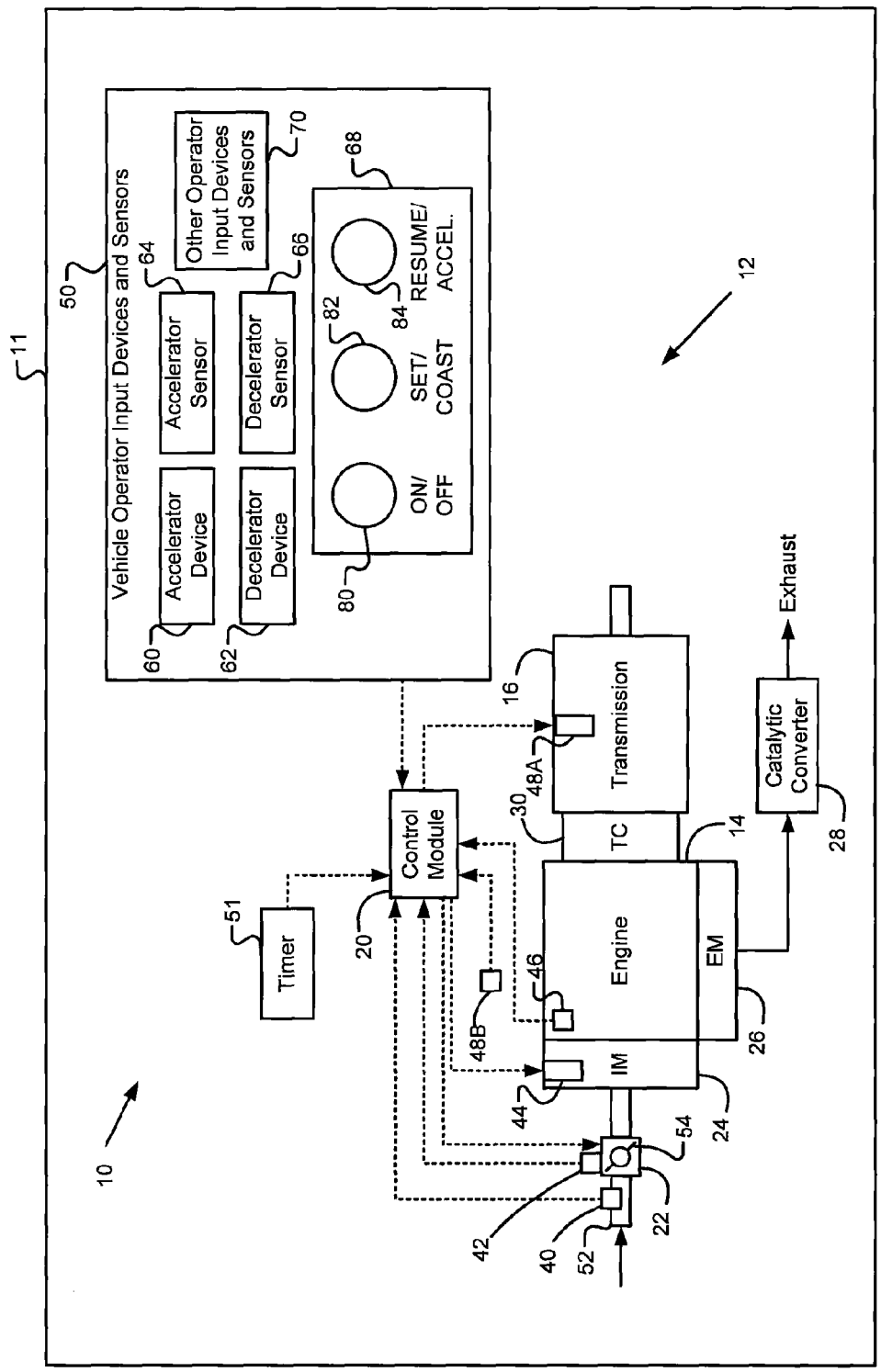
FIG. 1 is a functional block diagram of a vehicle system incorporating an exemplary cruise control system according to an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The below described embodiments overcome undesired cruise control system responses due to the use of a traditional calibration window. The embodiments provide techniques that are based on various inputs and parameters, such as vehicle target speed, current measured vehicle speed, cruise control commanded electronic throttle control (ETC) and other vehicle operator inputs and vehicle parameters. The embodiments improve performance adjustment and setting of a cruise control target speed. This improves vehicle operator satisfaction without sacrificing safety and security.

Referring now to FIG. 1, a functional block diagram of a vehicle system 10 of a vehicle 11 incorporating an exemplary cruise control system 12 is shown. The vehicle system 10 includes an engine 14 that drives a transmission 16 through a coupling device 30. The cruise control system 12 includes a control module 20 that regulates the operation of the engine 14 and a transmission 16 based on various vehicle operating parameters. The cruise control system 12 has an active state and an inactive state. The active state refers to when the cruise control system 12 is ON, a cruise control target speed is set, and the cruise control system 12 is actively attempting to maintain the vehicle 11 traveling at the target speed. The deactive state refers to when the cruise control system 12 is ON and is not actively maintaining the vehicle 11 at the target speed. A target speed may be set when the cruise control system 12 is deactive. When the cruise control system 12 is in the active state, the control module 20, upon receiving an operator command signal, maintains normal cruise control operation and evaluates reset enabling conditions. In other words, the control module 20 evaluates whether to grant a vehicle operator request to alter and/or reset the target speed. This is described in detail below.

In use, the vehicle system 10 draws air through a throttle 22 into an intake manifold 24, which distributes air to cylinders of the engine 14. The air is mixed with fuel at a desired air-to-fuel (A/F) ratio and the A/F mixture is combusted within the cylinders to generate drive torque. The combustion products are exhausted from the engine 14 through an exhaust manifold 26 and are treated in a catalytic converter 28 before being released to atmosphere.

In the case of an automatic transmission, a coupling device 30 between the engine 14 and the transmission 16 may be a torque converter that includes a torque converter clutch (TCC). The TCC is operable in an unlocked mode (i.e., released) to multiply torque transferred from the engine 14 to the transmission 16 and a locked mode to enable direct torque transfer from the engine 14 to the transmission 16. More specifically, in the unlocked mode, the torque converter provides a fluid coupling between engine output and transmission input shafts. In the locked mode, the TCC couples the engine output and the transmission input shafts for common rotation. In the case of a manual transmission, the coupling device 30 may be a clutch that is manually actuated by a vehicle operator to selectively uncouple the engine output and the transmission input shafts from common rotation.

The cruise control system 12 in addition to the control module 20 also includes vehicle sensors, such as a mass air flow (MAF) sensor 40, a throttle position sensor 42, a manifold absolute pressure (MAP) sensor 44, an engine RPM sensor 46, vehicle speed sensors 48, and vehicle operator input devices and sensors 50. The cruise control system 12 also includes a calibration timer 51.

The MAF sensor 40 is coupled to an air intake 52 and generates an MAF signal that is indicative of air flow. The throttle position sensor 42 generates a throttle position signal that is indicative of position of a throttle plate 54 of the throttle 22, which is controlled via one of the vehicle operator input devices 50, such as an accelerator pedal. The MAP sensor 44 generates a MAP signal indicative of pressure within the intake manifold 24. The engine speed sensors 46 may generate an RPM signal indicative of the rotational velocity of a crankshaft of the engine 14. The vehicle speed sensors 48 may include a transmission mounted sensor 48A and/or some other vehicle speed sensor 48B, such as an ABS sensor that is responsive to the rotation of a wheel. The vehicle speed sensors 48 or the control module 20, based on output signals therefrom, generate a current vehicle speed signal $V_{VEH}$ indicative of a current measured vehicle speed. It is also anticipated that a vehicle acceleration sensor may be included to monitor vehicle acceleration ($a_{VEH}$). Alternatively, the control module 20 may calculate vehicle acceleration $a_{VEH}$ based on other sensed operating conditions.

The control module 20 electronically controls a position of the throttle plate 54 to regulate air flow into the engine 14. The control module 20 also regulates operation of the engine 14 in a cruise control mode (e.g., adaptive or standard) based on an operator input. More specifically, when the operator engages cruise control (i.e., ON), the control module 20 regulates operation of the engine 14 and the transmission 16 to maintain the target speed. During cruise and in the case of an automatic transmission, the control module 20 regulates transmission gear shifts and TCC mode based on the vehicle operating conditions. More specifically, shifts may be determined using a pre-programmed shift map or table based on throttle position and the vehicle speed signal $V_{VEH}$.

The throttle control evaluates vehicle operating parameters to determine whether a shift (e.g., downshift) is required. The vehicle operating parameters may include vehicle speed error $V_{ERR}$, vehicle acceleration $a_{VEH}$, MAP, engine torque reserve and performance enrichment onset. Engine torque reserve is defined as the amount of available engine torque above that which is being provided to vehicle wheels, for a given gear ratio.

In the case of a manual transmission, the throttle control does not induce or inhibit shifting of the transmission 16. Instead, the cruise throttle control initiates a shift indicator that is visual, audible or both, and which advises the vehicle operator that a shift should be performed.

The control module 20 may have a central processing unit, memory (RAM and/or ROM), and associated input and output buses or be of some other module form. The control module 20 may be a portion of a central vehicle main control unit, an interactive vehicle dynamics module, a power control module, an ignition controller, an engine control module (ECM), a transmission control module (TCM), a control circuit having a power supply, combined into a single integrated controller, or may be a stand-alone controller as shown.

The vehicle operator input devices and sensors 50 include one or more acceleration devices 60 and deceleration devices 62, such as an accelerator pedal and a brake pedal. The acceleration and deceleration devices 60, 62 may include corresponding acceleration and deceleration sensors 64, 66, such as an acceleration pedal position sensor or a brake pedal position sensor. The vehicle operator input devices and sensors 50 include a cruise control interface 68, as well as other operator input devices and sensors 70.

The cruise control interface 68 includes an ON/OFF control device 80, a SET/COAST control device 82 and a RESUME/ACCELERATE control device 84. The control devices 80, 82, 84 may be in the form of switches, buttons, sliders, or may be in some other form. The control devices 80, 82, 84 may provide control signals that are either HIGH or LOW. For example, when OFF, the control signal of the ON/OFF device 80 is LOW (i.e., 0) and when ON the ON/OFF device 80 signal is HIGH (i.e., 1). Similarly, the control signals of the SET/COAST device 82 and the RESUME/ACCELERATE device 84 are normally LOW (i.e., 0), and are HIGH (i.e., 1) when actuated or depressed.

The ON/OFF device 80 enables a vehicle operator to power the cruise control system 12. The SET/COAST device 82 enables the vehicle operator to set a target speed in memory ($S_{MEM}$) or coast while the cruise control system 12 is ON. By tapping the SET/COAST device 82 the vehicle operator sets the target speed $S_{MEM}$ at a current vehicle speed. By holding the SET/COAST device 82 in an ON position, the vehicle coasts.

The RESUME/ACCELERATE device 84 enables a vehicle operator to resume at the target speed $S_{MEM}$ from another speed or accelerate the vehicle from the target speed $S_{MEM}$ while operating with the cruise control system 12 in an ON state. For example, the cruise control system 12 is ON and the vehicle operator depresses a brake pedal thus, placing the cruise control system 12 in the deactive state. The RESUME/ACCELERATE device 84 enables the vehicle operator to activate the cruise control system 12 and to accelerate to and regulate vehicle operation to maintain the previous target speed $S_{MEM}$. When the cruise control system 12 is active, the vehicle operator may hold the RESUME/ACCELERATE device 84 depressed to accelerate the vehicle 11 from the target speed $S_{MEM}$. Additionally, the vehicle operator may tap the RESUME/ACCELERATE device 84 to increase the target speed $S_{MEM}$ by a pre-determined speed value, such as 1 mph, or the SET/COAST device 82 to decrease the target speed $S_{MEM}$ by 1 mph. Other cruise control system operating modes are described below.

Figure 2:
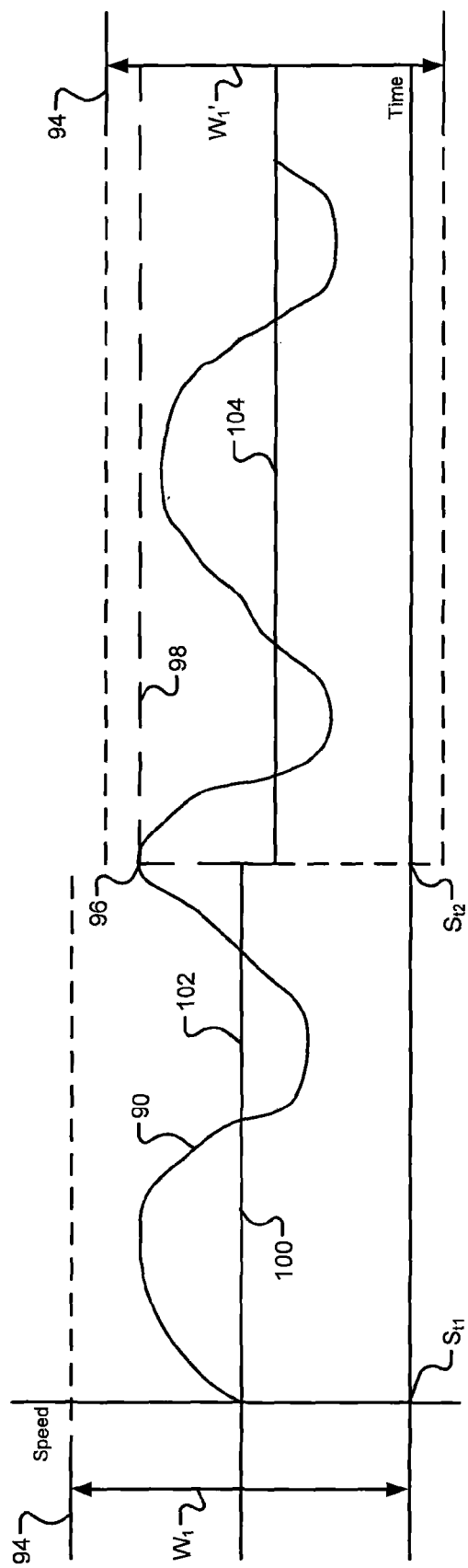
FIG. 2 is a first current vehicle speed plot for a first example condition illustrating change in target speed by a traditional cruise control system.

Referring now to FIG. 2, a first current vehicle speed plot for a first example condition illustrating change in target speed by a traditional cruise control system is shown. The first plot, as well as each other current vehicle speed plot below described, provides a current vehicle speed curve over time. The current vehicle speed of the embodiment of FIG. 2 is represented by solid line 90. The traditional cruise control system attempts to maintain the current vehicle speed 90 about a first or previous target speed 100, which is set at a first set time $S_{t1}$. The traditional cruise control system has a calibration window 94 that is centered about the target speed and has a width $W_1$.

When a vehicle operator request command signal is received from a vehicle operator that is greater than a cruise control command signal and vehicle speed is within the calibration window 94, the target speed is reset and decreased by approximately 1 mph when the set button is pushed. The calibration window 94 shifts with change in target speed, as shown. Point 96 corresponds with a second set time $S_{t2}$ when a set command signal is generated by the vehicle operator to reset the target speed.

A vehicle operator request command signal refers to a signal generated as a result of the vehicle operator actuating an acceleration device or deceleration device other than a SET device to accelerate or decelerate the vehicle. A cruise control command signal refers to a signal generated by a vehicle control system to maintain the set target speed and may be associated with the position of a throttle, the torque of an engine, or some other target speed maintaining parameter. The cruise control command signal may be directly proportional to the target speed. The cruise control command signal may be generated to alter engine output power, which may be altered via an ETC or adjustment of throttle position.

The vehicle operator intended target speed reset is represented by dashed line 98. The cruise control target speed is represented by solid line 100. The cruise control target speed 100 has a first segment 102 and a second segment 104. The first segment 102 is associated with the original set target speed and the second segment 104 is associated with the new target speed. The calibration window shifts with the target speed, and is designated $W_1'$. Thus, the response to the request command signal and the set command signal is undesired since the vehicle operator intended an increase in the target speed and a decrease occurred.

Figure 3:
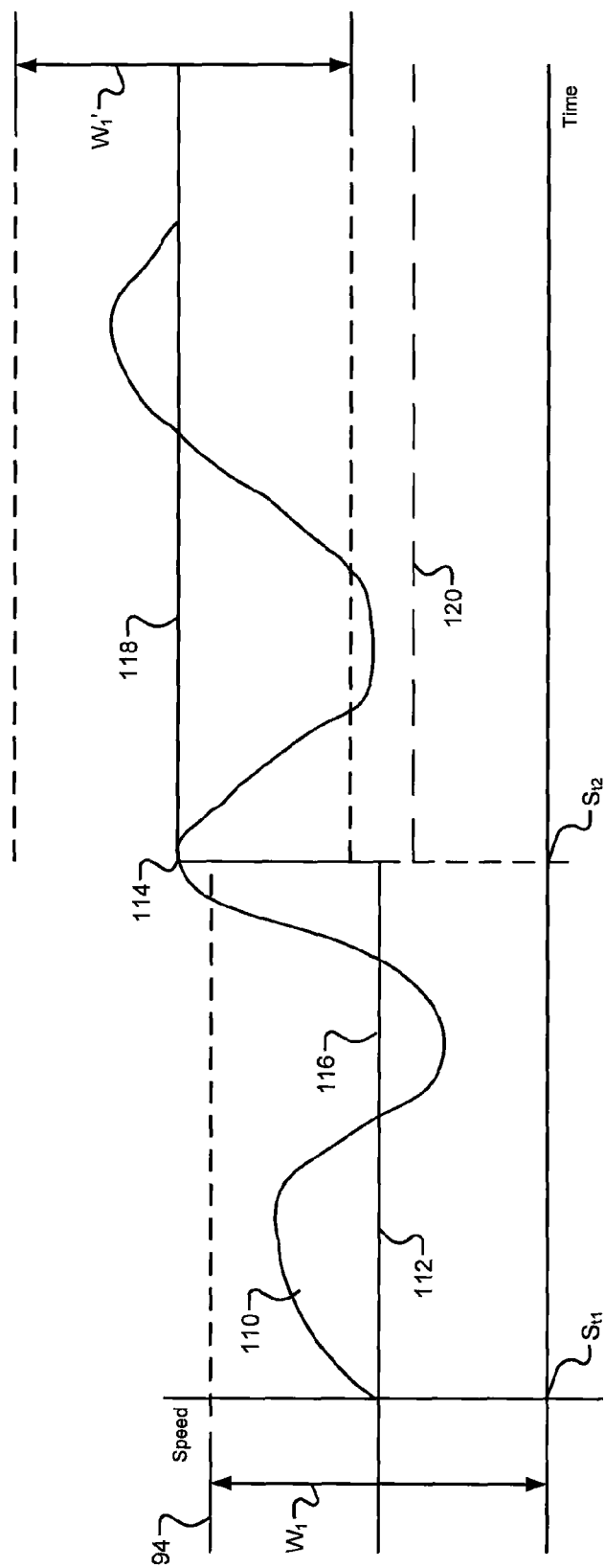
FIG. 3 is a second current vehicle speed plot for a second example condition illustrating change in target speed by the traditional cruise control system.

Referring now to FIG. 3, a second current vehicle speed plot for a second example condition illustrating change in target speed by the traditional cruise control system is shown. According to a traditional cruise control system, when a vehicle operator request command signal is not received, when cruise control is ON, and when a current vehicle speed 110 is outside the calibration window 94, the target speed is reset to the speed requested by the SET command signal. Point 114 corresponds with a second set time $S_{t2}$ when a set command signal is generated by the vehicle operator to reset the target speed. The cruise control target speed is represented by solid line 112. The cruise control target speed 112 also has a first segment 116 and a second segment 118 that are associated with the original target speed and the new target speed, respectively. The intended target speed is represented by dashed line 120. Thus, this cruise control system response to the set command signal is undesired, since the vehicle operator intended a decrease in the target speed.

Figure 4:
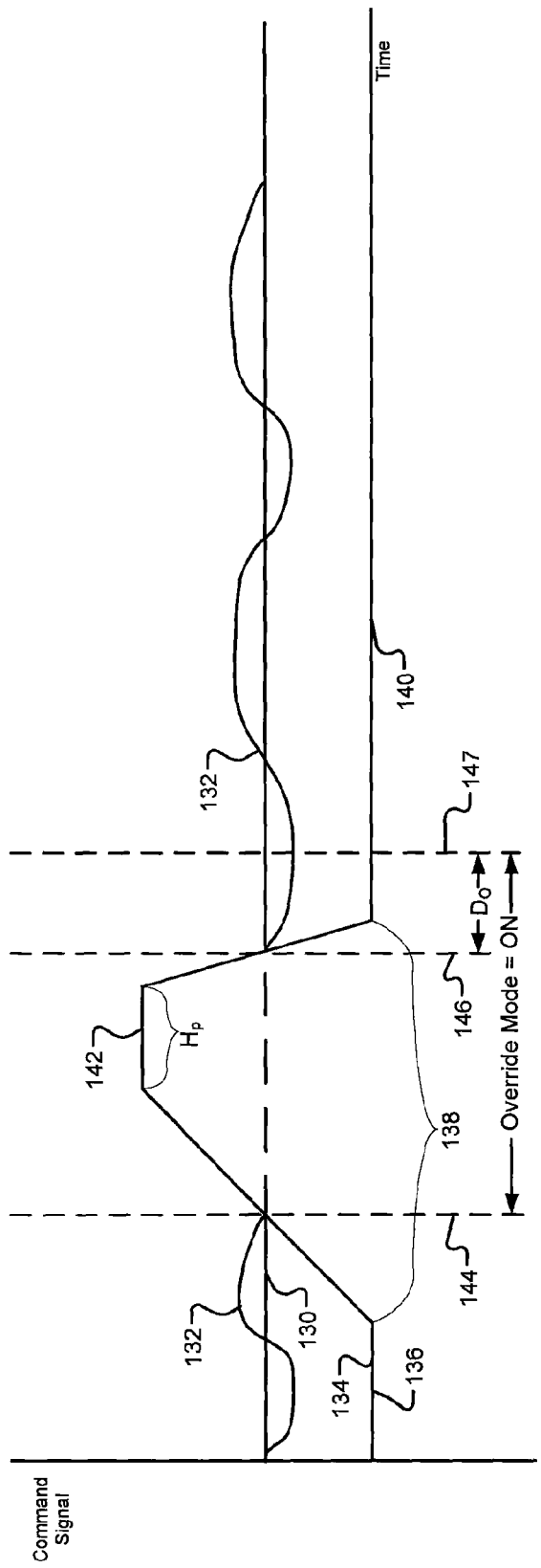
FIG. 4 is a command control diagram according to an embodiment of the present disclosure.

Referring now to FIG. 4, a command control diagram according to an embodiment of the present disclosure is shown. Given a set target speed a vehicle control system may have a set or nominal cruise control command target 130, a current cruise control command signal 132 around its target 130, and a vehicle operator request command signal 134 are shown. One example of a cruise control command signal is a throttle control signal. The vehicle operator request command signal or vehicle operator input signal 134 has: a first phase 136 that is associated with not receiving an operator input signal; a second phase 138 that is associated with the reception of an operator input signal; and a third phase 140 that is also associated with not receiving an operator input signal.

Figure 5:
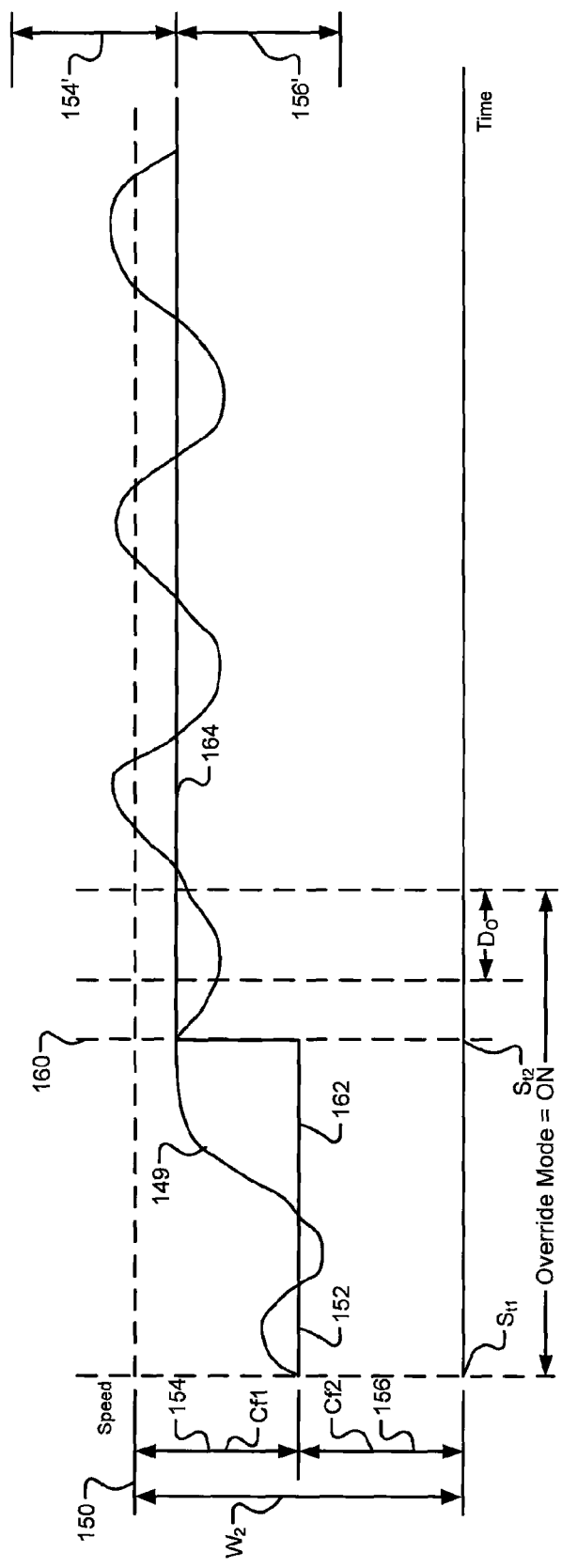
FIG. 5 is a third current vehicle speed plot for a similar condition as that of FIG. 2 illustrating change in target speed according to an embodiment of the present disclosure.
Figure 6:
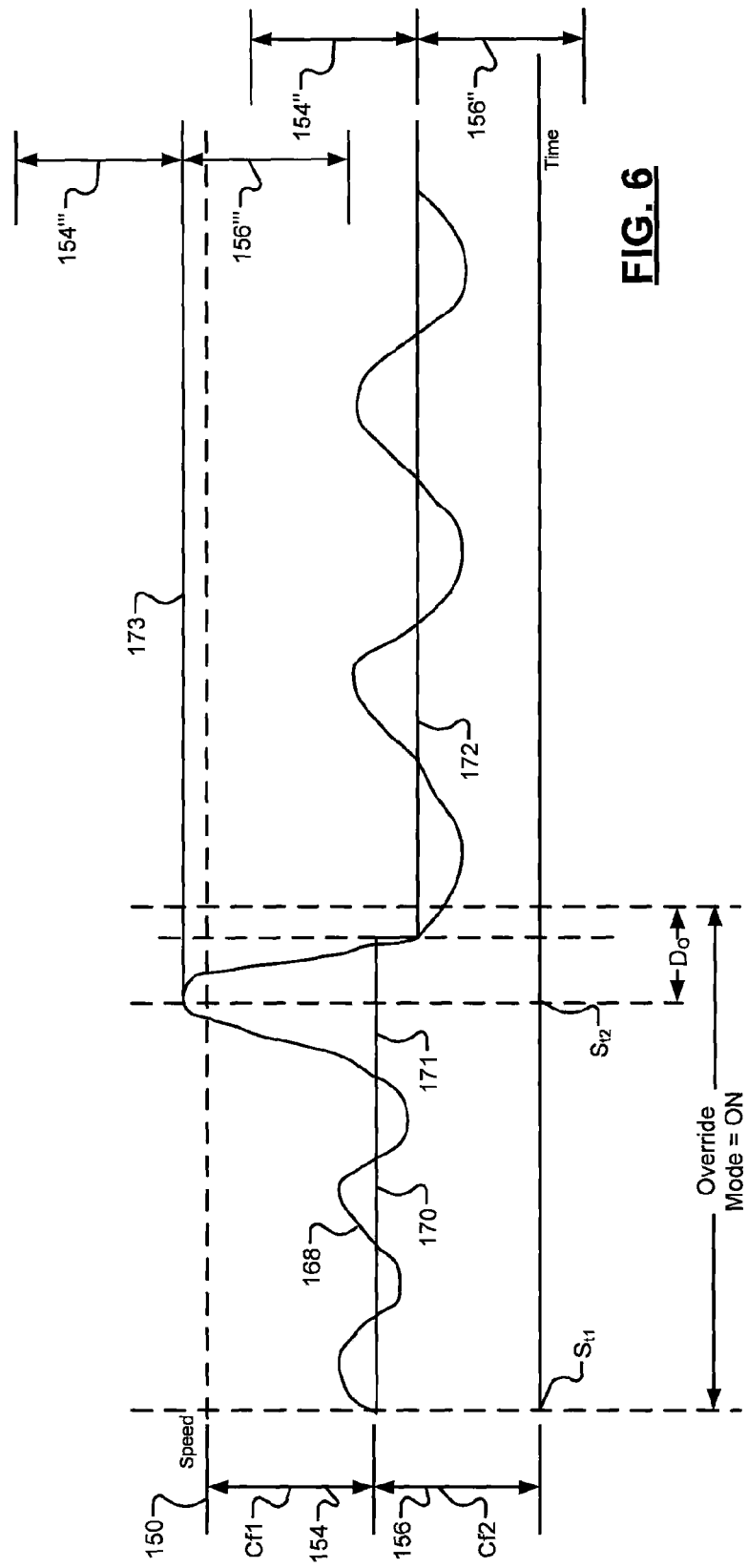
FIG. 6 is a fourth current vehicle speed plot for a similar condition as that of FIG. 3 illustrating change in target speed according to another embodiment of the present disclosure.

For the example shown, during the second phase 138 the operator request command input signal 134 is received and increases to a desired value 142, remains at that value for a hold period $H_p$, and then decreases. During the second phase 138 and when the operator input signal 134 increases above the cruise control command target 130 or a current cruise control command signal 132, a cruise control override mode is triggered ON. The moment in time that the override mode is triggered ON is represented by vertical dashed line 144. When the override mode is triggered ON, a new target speed may be set to a speed associated with a received SET command signal. This change in target speed and the associated current vehicle speed response is shown in FIGS. 5 and 6. During the period that the override mode is enabled, when the operator input signal 134 decreases to less than the cruise control command target 130 or a previous cruise control command signal 132, an OFF delay period $D_o$ begins, as represented by dashed vertical line 146. The delay period $D_o$ ends, as represented by dashed vertical line 147. A new target speed may be set during the OFF delay period $D_o$ when the operator input signal 134 is less than the target 130 or a previous cruise control command signal 132.

Referring now to FIG. 5, a third current vehicle speed plot illustrating change in target speed according to an embodiment of the present disclosure is shown. A current vehicle speed 149 is shown. According to an embodiment of the present disclosure, a cruise control system, such as the cruise control system 12, has a calibration window 150 that may be centered about a target speed and has a width $W_2$. The cruise control target speed is represented by solid line 152. The calibration window 150 has a first calibration factor Cf1 and a second calibration factor Cf2. The first calibration factor Cf1 is associated with an upper portion 154 of the calibration window 150. The second calibration factor Cf2 is associated with a lower portion 156 of the calibration window 150. The upper portion 154 is the portion of the window 150 that is above the cruise control target speed 152. The lower portion 156 of the calibration window 150 is the portion of the window 150 that is below the cruise control target speed 152. The upper portion 154 and the lower portion 156 may be different in size. In one embodiment, the portions 154, 156 are equal in size. In another embodiment, the upper portion 154 and the lower portion 156 are set equal to approximately 5 mph. The calibration window 150 shifts with change in target speed, as shown.

When the cruise control system, receives a request command signal from a vehicle operator that is greater than the cruise control command signal and vehicle speed is within the calibration window 150, the target speed is reset and increased to a speed associated with the request command signal. Point 160 is associated with a moment in time when a set command signal is generated to reset the target speed. The cruise control target speed 152 has a first segment 162 and a second segment 164 that are respectively associated with the original target speed and the new target speed. The vehicle operator intended target speed is the same as the new target speed. The shifted upper and lower portions of the calibration window 150 are designated 154' and 156', respectively. Thus, the response to the request command signal and the set command signal is the same as that intended by the vehicle operator.

Referring now to FIG. 6, a fourth current vehicle speed plot illustrating change in target speed according to another embodiment of the present disclosure is shown. When the override mode is ON including the period of $D_o$, which is shown in FIG. 4, the target speed is reset to a current speed when the SET button is pushed regardless of whether the current vehicle speed 168 is within or outside the window 150. The target speed may be reset and/or increased to target speed 173 or reset and/or decreased to target speed 172. The target speed is set at target speed 173 or target speed 172 based on when the SET button is pushed. The target speed 172 may not be 1 mph from target speed 171, but may be equal to the current speed when reset occurs. Thus, the response to the set command signal is that which is intended by the vehicle operator. The above example vehicle operating conditions and situations of FIGS. 5 and 6, as well as others, are covered by the below-described method of FIG. 7.

Figure 7:
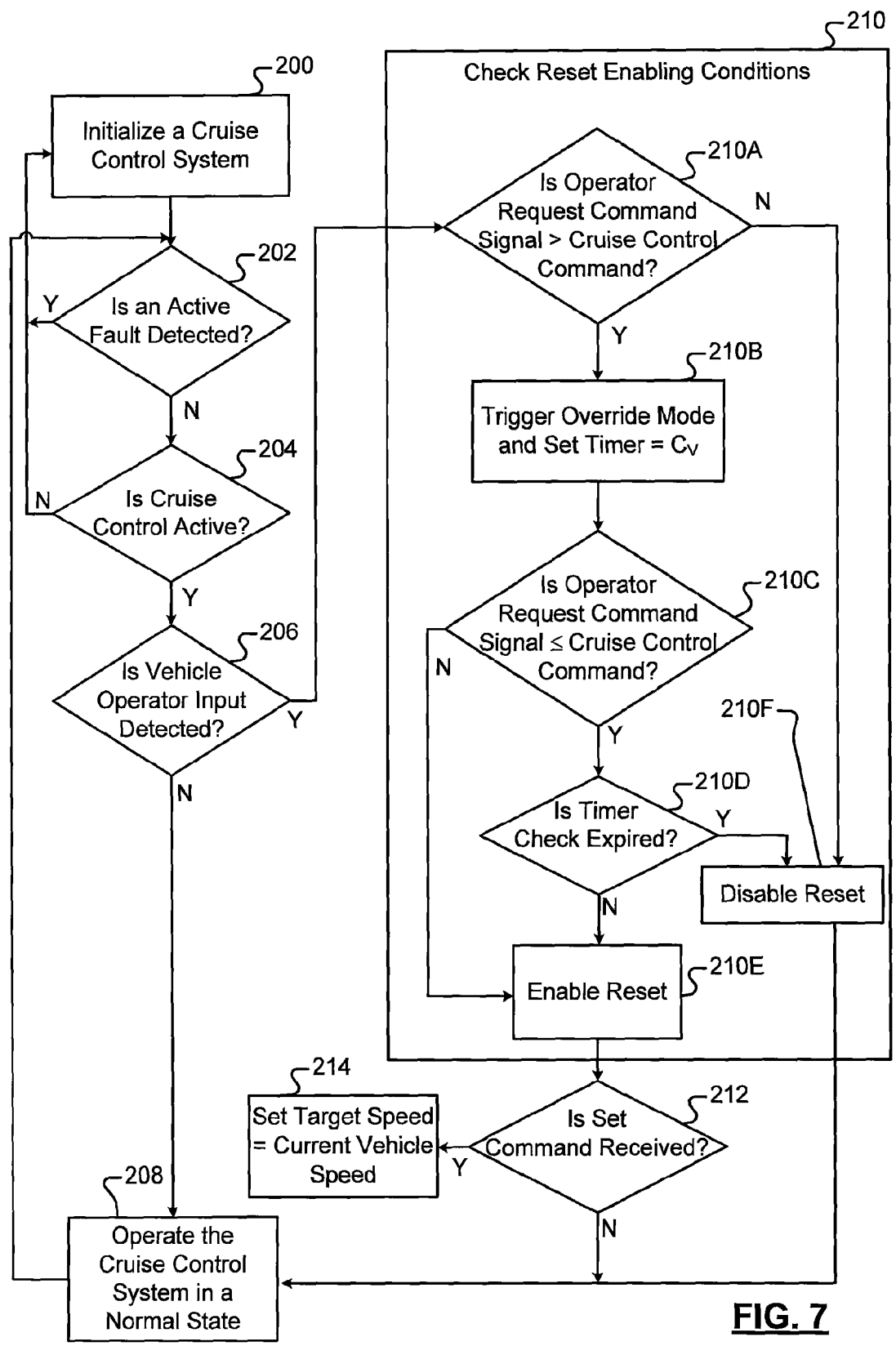
FIG. 7 is a logic flow diagram illustrating a method of operating a cruise control system according to an embodiment of the present disclosure.

Referring now to FIG. 7, a logic flow diagram illustrating a method of operating a cruise control system according to an embodiment of the present disclosure is shown. Although the following steps are described primarily with respect to the embodiment of FIG. 1, the steps may be easily modified to be applied to other embodiments of the present invention.

In step 200, the cruise control system 12 is initialized. The cruise control ON/OFF switch 80 may be switched to an ON state. In step 202, the control module 20 determines whether an active system fault exists. When a fault does not exist, step 204 is performed, otherwise the control module 20 returns to step 200. In step 204, the control module 20 determines whether the cruise control system 12 is active. When initialized and active, the cruise control system 12 operates in a normal state. When the control module 20 is active, step 206 is performed, otherwise step 200 is performed.

In step 206, the control module 20 determines whether a vehicle operator input is received. The vehicle operator input may be in the form of a request command signal and/or a set command signal. The vehicle operator input may be from any of the input devices 50. When a vehicle operator input has not been received, step 208 is performed, otherwise step 210 is performed.

In step 208, the cruise control system 12 operates in the normal state. While in the normal state, the cruise control system 12 maintains the current vehicle speed at the set target speed. The control module 20 repeats steps 202-208.

In step 210, the control module 20 checks reset enabling conditions to determine whether to operate in an override mode. Although the following steps describe several reset enabling conditions, other reset enabling conditions may be incorporated. In step 210A, the control module 20 compares a received request command signal with a cruise control command signal. When the request command signal is greater than the cruise control command signal, then step 210B is performed, otherwise step 210F is performed.

In step 210B, the control module 20 triggers the override mode ON. The control module 20 also sets and starts the timer 51. The timer 51 is set to a predetermined calibration value $C_v$. The calibration value $C_v$ may be based on a function of an accelerator pedal signal, ETC command signal, cruise control ETC command signal, measured or current vehicle speed, target speed, or some other parameter and be in essence of acceleration or deceleration. For example, the calibration value $C_v$ may be a function of a filtered accelerator pedal signal divided by an ETC command signal minus a cruise control ETC command signal in essence of acceleration. As another example, the calibration value $C_v$ may be a function of measured vehicle speed minus a target speed in essence of deceleration.

In step 210C, the control module 20 determines whether the request command signal is less than or equal to the cruise control command signal. When the request command signal is less than or equal to the cruise control command signal, step 210D is performed, otherwise step 210E is performed. In step 210D, the turn-off delay timer 51 is reduced at a pre-determined loop rate and monitored. When the timer 51 is expired, step 210F is performed, otherwise step 210E is performed. In step 210E, an override reset of the target speed is enabled. This allows for the current target speed setting to be changed in step 214. In step 210F, an override reset of the target speed is disabled and the control module 20 returns to step 208. The target speed is maintained at the current setting.

In step 212, the control module 20 determines whether a vehicle operator reset request is received. When a SET command signal is received from the vehicle operator, step 214 is performed, otherwise step 208 is performed.

The above-described steps are meant to be illustrative examples; the steps may be performed sequentially, synchronously, simultaneously, or in a different order depending upon the application.

The above method compares the cruise control command signal to the vehicle operator request command signal, and triggers intrusive control of the target speed when a vehicle operator request is greater than cruise control command. When intrusive control is triggered, the timer is initialized to a calibratable value. The timer 51 is used for the reset-enabling turn-off delay after the vehicle operator request is less than the cruise control command. When the driver presses the SET button, and when the override mode is on including the timer 51 is not expired, a new target speed is set at the current vehicle speed.

Referring again to FIG. 1, the cruise control system 12 may also operate in any of the following different modes including: disabled, standby disabled, standby enabled, engaged, resume, overspeed resume, accelerate from engaged, accelerate from standby enabled, coast, tap-up and tap-down. Resume, overspeed resume, accelerate from engaged, accelerate from standby, engaged, coast, tap-up and tap-down modes are transient modes.

In the disabled mode, the ON/OFF switch 80 is in the OFF state, cruise control is non-operative and the target speed $S_{MEM}$ is cleared. In the standby disabled mode, cruise control exits the disabled mode when the ON/OFF switch 80 is in the ON state and the brake before cruise security feature is met. The brake before cruise security feature ensures brake inputs are read into the PI control properly. In the standby enabled mode, the ON/OFF switch 80 is in the ON state and the set/coast and resume/accelerate signals are zero.

The cruise control transitions from the standby enabled mode to the engaged mode on the failing edge of a set/coast signal. In other words, the cruise control enters the engaged mode from any transient mode (i.e. resume, overspeed resume, accelerate from engaged, accelerate from standby enabled, coast, tap-up or tap-down) on the failing edge of the set/coast or resume/accelerate signals. In the engaged mode, the PI control maintains the vehicle speed $S_{VEH}$ at the target speed $S_{MEM}$. When entering engaged mode from standby enabled, accelerate from engaged, coast or accelerate from standby enabled modes, the target speed $S_{MEM}$ is set equal to the vehicle speed $S_{VEH}$.

In the resume mode, the PI control resumes (i.e. accelerates to) the last target speed $S_{MEM}$. From the accelerate mode or from the standby enabled mode, the resume mode is entered if a timer is less than a resume to accelerate transition time ($T_{RESACC}$) and the vehicle speed $S_{VEH}$ is less than the target speed $S_{MEM}$ (i.e., an underspeed condition). From overspeed resume mode, the resume mode is entered if the timer is greater than or equal to $T_{RESACC}$ and the failing edge of the resume/accelerate signal occurs. Alternatively, the resume mode is entered from the overspeed resume mode if the timer is less than $T_{RESACC}$, the failing edge of the resume/accelerate signal occurs and the vehicle speed $S_{VEH}$ is less than the target speed $S_{MEM}$.

In the overspeed resume mode, the PI control decelerates the vehicle to the last target speed $S_{MEM}$. The overspeed resume mode is entered from the standby enabled mode on the failing edge of the resume/accelerate signal when $S_{ERROR}$ is greater than a maximum allotted error ($E_{MAX}$) for cruise control to go into the accelerate from standby enabled mode.

The accelerate from engaged mode is entered into when the RESUME/ACCELERATE switch 84 is depressed and a timer is greater than a tap-up to acceleration time threshold ($T_{TAPUPTRANS}$). In the accelerate from engaged mode, the PI control accelerates the vehicle until the resume/accelerate switch 84 is released. The accelerate from engaged mode does not affect the target speed $S_{MEM}$.

In the accelerate from standby enabled mode, the PI control remains in this mode until the RESUME/ACCELERATE switch 84 is released. Once the resume/accelerate switch 84 is released the PI control enters the resume mode and accelerates the vehicle until the target speed $S_{MEM}$ is achieved. The accelerate from standby mode is entered on the rising edge of the resume/accelerate switch signal if the $S_{ERROR}$ is less than a maximum error ($S_{ERRORMAX}$). The accelerate from standby enabled mode does not affect $S_{MEM}$.

The coast mode is entered into from the resume mode on the failing edge of the set/coast switch signal. The coast mode is entered into from the tap-down mode if the set/coast signal is high and a timer is greater than a tap-down to coast transition time threshold ($T_{TAPDWNCST}$). In the coast mode, the throttle area is reduced and the vehicle decelerates until the set/coast switch is released. The coast mode does not affect the target speed $S_{MEM}$.

The tap-up mode increases the vehicle speed by 1 mph. The tap-up mode is entered from the overspeed resume, tap-down, accelerate from engaged, tap-up, engaged or coast modes if the rising edge of the RESUME/ACCELERATE switch 84 signal occurs. The PI control also increments the target speed $S_{MEM}$ by one mph. Conversely, the tap-down mode decreases the vehicle speed by 1 mph. The tap-down mode is entered from the tap-down, tap-up, engaged, accelerate from engaged or accelerate from standby enabled modes if the rising edge of the set/coast switch signal occurs. The PI control also decrements the target speed $S_{MEM}$ by one mph. The tap-up and tap-down modes occur in 1 second increments. Upon the expiration of 1 second after the corresponding switch has been tapped, the cruise control mode goes back to engaged with the target speed $S_{MEM} \pm 1$ mph.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cruise control system comprising:
an input device that generates an operator input signal; and
a control module that generates a cruise control command signal to maintain a vehicle speed at a set target speed,
wherein said control module operates in a normal mode that is associated with decreasing said set target speed, based on said operator input signal, when said vehicle speed is within a window about said set target speed, and
wherein said control module overrides said normal mode and enables reset of said set target speed to a current vehicle speed, which is based on said operator input signal, when the operator input signal is greater than the cruise control command signal.

2. The cruise control system of claim 1 wherein said control module enables reset of said set target speed when said operator input signal includes a request command signal that is greater than said cruise control command signal.

3. The cruise control system of claim 1 further comprising a timer, wherein said control module resets said target speed based on said timer.

4. The cruise control system of claim 1 wherein said control module enables said reset when a request command signal is greater than said cruise command signal and said vehicle speed is within said window.

5. The cruise control system of claim 1 wherein said control module enables said reset when the current vehicle speed is greater than said set target speed and is outside said window.

6. The cruise control system of claim 5 wherein a request command signal is received and is associated with vehicle deceleration.

7. The cruise control system of claim 1 further comprising a SET input device, wherein said control module resets said set target speed based on a set command signal received from said SET input device.

8. A cruise control system comprising:
an input device that generates an operator input signal; and
a control module that initializes a time period when said operator input signal includes a request command signal that is greater than a cruise control command signal, wherein said control module sets said time period based on one of an acceleration rate and a deceleration rate of a vehicle, and
wherein said control module resets a set target speed based on expiration of said time period and said operator input signal.

9. The cruise control system of claim 8 wherein said control module enables reset of said target speed when said operator input signal includes a request command signal that is greater than a cruise control command signal.

10. The cruise control system of claim 8 wherein said control module triggers an override mode when said operator input signal includes a request command signal that is greater than a cruise control command signal.

11. The cruise control system of claim 8 wherein said control module enables reset of said target speed when said operator input signal includes a request command signal is less than said cruise control command signal.

12. The cruise control system of claim 8 further comprising a SET input device, wherein said control module resets said set target speed based on a set command signal received from said SET input device.

13. A method of operating a cruise control system comprising:
generating a request command signal based on an operator input;
generating a cruise control command signal to maintain a vehicle speed at a set target speed;
operating in a normal mode that is associated with decreasing said set target speed, based on said operator input, when said vehicle speed is within a window about said set target speed; and
overriding said normal mode and enabling reset of said set target speed to a command speed, which is associated with said operator input, when said vehicle speed is inside said window.

14. The method of claim 13 comprising:
setting a time period; and
resetting said set target speed based on said operator input and expiration of said time period.

15. The method of claim 13 comprising enabling reset of said target speed when said request command signal is less than or equal to said cruise control command signal.

16. The method of claim 13 further comprising disabling reset of said set target speed when a timer is expired.

17. The method of claim 13 comprising:
enabling reset of said set target speed;
receiving a SET command signal based on said operator input; and
resetting said target speed based on said enablement and said SET command signal.

18. The cruise control system of claim 1, wherein said window comprises:
a first portion associated with vehicle speeds greater than said set target speed; and
a second portion associated with vehicle speeds less than said set target speed, wherein said second portion is different in size than said first portion.

19. The cruise control system of claim 8, wherein said control module sets said time period based on an accelerator pedal signal, a throttle control signal, and a cruise control command signal.

20. The cruise control system of claim 8, wherein said control module sets said time period based on a vehicle speed and said set target speed.

21. The cruise control system of claim 8, wherein said control module resets said set target speed when said time period expires and a vehicle speed is within a window of said set target speed.

* * * * *